Patented Feb. 11, 1936

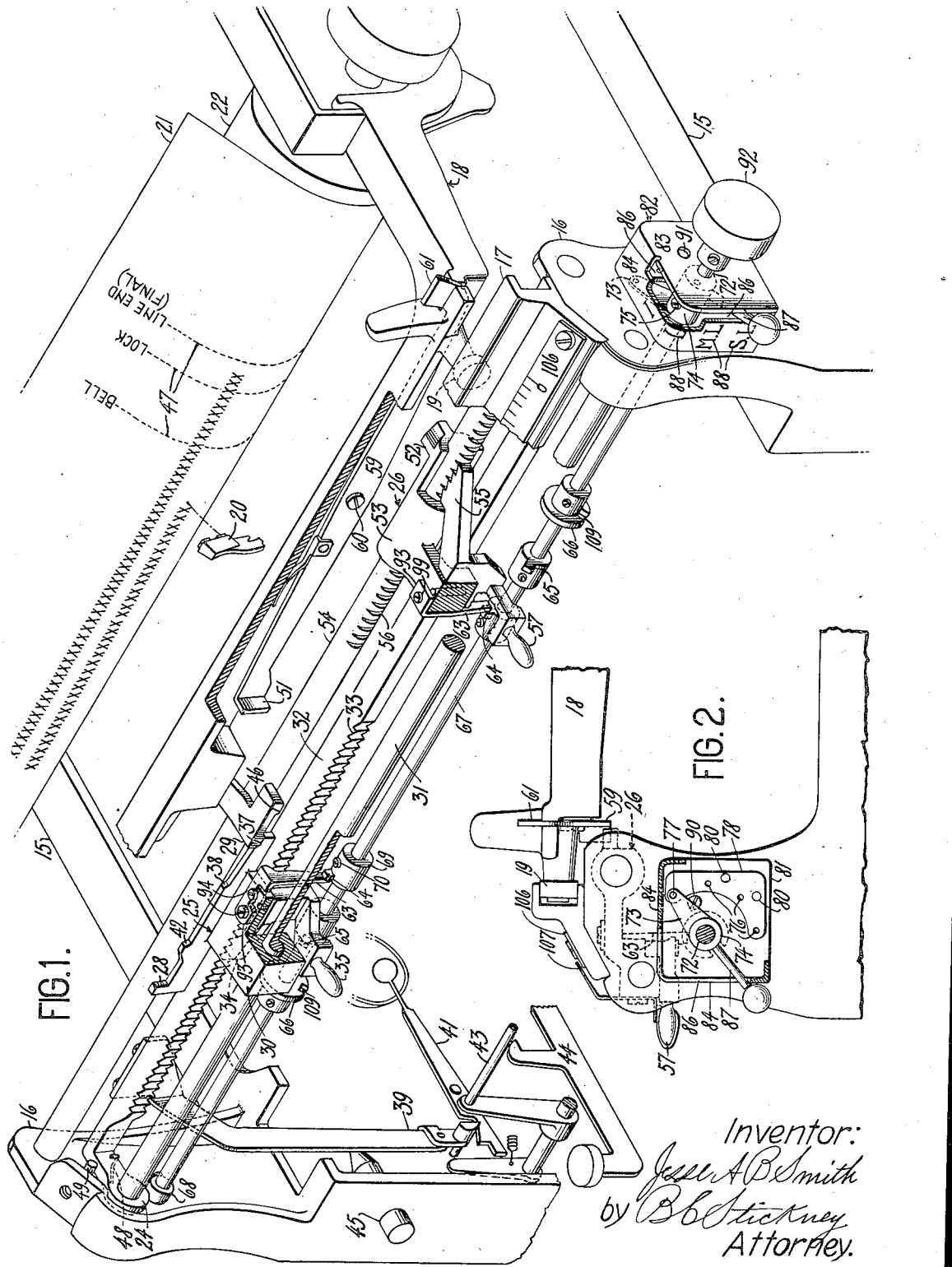

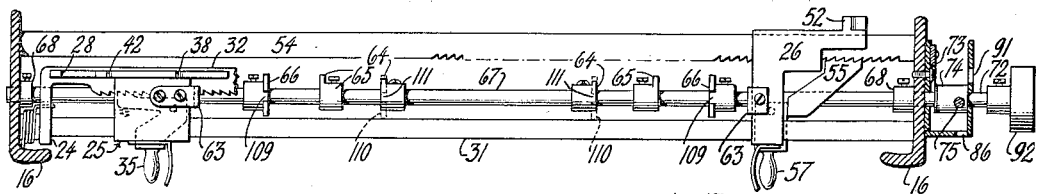

2,030,409

UNITED STATES PATENT OFFICE 2,030,409

TYPEWRITING MACHINE

Jesse A. B. Smith, Stamford, Conn., assignor to Underwood Elliott Fisher Company, New York, N. Y., a corporation of Delaware Application May 11, 1935, Serial No. 20,926

16 Claims. (Cl. 197—63)

This invention relates to the line-length or margin-gage mechanism for typing-machine carriages, and aims to provide means for facilitating the resetting of the margin-gages relatively to certain selective standards of line-lengths, it being a further object of the invention to have said means simple in structure and arrangement, and therefore inexpensive and easily applicable to existing machines.

To these and other ends, each of the two margin-gages of the Underwood typewriter, for example, may have added thereto a new gage-arm which extends to a point adjacent a cross-shaft which is rotatable to selective stations, so that one or another of a sufficient plurality of pairs of stops provided thereon may be presented in line with said gage-arms for resetting the margin-gages thereto, the pairs of stops being angularly spaced on said shaft.

The shaft-stops may be laterally adjusted to and held in such positions that the separation and location of the stops of each pair will be proper for a certain line-length or work-sheet width.

For illustration, provision for an assortment of three line-length standards is herein considered, namely, a short line, a long line and an intermediate line length.

Preparatory to using, for example, a narrow or small letter sheet, the stop-shaft is set to small-letter or "short line" station. This aligns a certain pair of shaft-stops with the margin-gage-arms, and the margin-gages may then be moved to bring said arms against these stops. The margin-gages will then be in proper positions for the short line and will remain so throughout the typing of the sheet and successive sheets.

If it is desired to no longer use the short line or narrow sheets, but say the intermediate-line lengths for intermediate-width sheets, the shaft is rotated to the "medium-line" station. This puts another pair of stops, which are more separated, into line with the margin-gage-arms. The margin-gages are then reset to bring their said arms into abutment with said intermediate stops, and are thereby quickly and properly relocated for typing upon the medium-width worksheets, and so remain so long as it is desired to use the intermediate work-sheets.

When it is desired to use the longest line say for still wider letters, the shaft may be turned to a third position which aligns a pair of extremely separated stops on the shaft with the margin-gage-arms. The margin-gages are then moved so that their arms will abut the extreme stops; the margin-gages being maintained in these positions for typing the wide sheets.

There may be further provision for rotating the shaft to move the outermost stops to inoperative positions without moving the other stops into operative positions. By such provision, adjustment of the margin-gages is rendered independent of the new series of stops.

The shaft may be rotated by a handle disposed at the end thereof, and which may also serve as an index of the setting of the shaft. Or, if preferred, a hand wheel or knob may be secured upon the end of the shaft, in lieu of the handle.

Detent-means may be provided for holding the shaft steady at any station to which it may be set.

The invention affords a substantial range of use for the set of shaft-stops, and it increases the usefulness of the margin-gage mechanism. For example, the outermost stops may be made of such extent circumferentially of the shaft as to be usable for setting the margin-gages to wide-sheet position when the shaft is set to bring the innermost stops into use. It is thus feasible to have the shaft stand in a single position for the use of an innermost pair of stops or an outermost pair of stops, and in that case the margin-gages can be shifted to abut either the inner or outer stops, at will, the margin-gage-arms passing freely by the intermediate stops.

The margin-gages retain their usual functions in the machine, in that said functions are not affected or interfered with by the novel devices for resetting the margin-gages.

Other features and advantages will hereinafter appear.

In the accompanying drawings,

Figure 1 is a perspective view of the margin-gage mechanism, including the improvements, and related parts of a typing machine; some parts being sectioned and broken away for clearness.

Figure 2 is a side elevation view of the machine-portion which includes the margin-gage mechanism and improvements, certain parts of the latter being sectioned for clearness.

Figure 3 is a plan view, partly sectioned, showing details of the margin-gage-setting stop-shaft and its mounting and also represents said shaft rotated to neutral position for setting the margin-gages independently of the stops on said shaft.

Figure 4 represents typing on a work-sheet in lines of the longest-length standard.

Figure 5 is a front view diagram representing the stop-shaft at its long-line or wide-sheet station and the margin-gages set to the outermost or long-line pair of stops.

Figure 6 represents typing on a work-sheet in lines of the medium-length standard.

Figure 7 is a front view diagram representing the stop-shaft at its medium-line-length station, and represents the margin-gages as being set to the intermediate pair of stops.

Figure 8 represents typing on a work-sheet in lines of the shortest-length standard.

Figure 9 is a front view diagram showing the stop-shaft set to short-line or narrow-sheet station, and represents the margin-gages as being set to the short-line pair of stops.

Figure 10 is a fragmentary side elevation view showing an arrangement for mounting the stop-shaft and other elements independently of side-members of the machine-frame.

A typing machine such as the Underwood is herein represented by such portions thereof as are necessary for an understanding of the invention.

Main frame 15 of the machine includes standards 16, supporting a front track-bar 17 for a letter-feeding carriage 18, which has front rolls, represented at 19, engaging said track-bar 17; said carriage being also guided at its rear on a track not shown.

At operation of types 20 to print upon a work-sheet 21 positioned around a platen 22, supported within said carriage 18, the latter moves in letter-feeding steps by means of the usual letter-feed mechanism not shown.

A margin-gage 25 presents a stop-lug 28 opposite a counter-stop 29 on the carriage 18, for limiting movement of the latter in leftward or letter-feed direction.

For its lateral adjustment, said margin-gage 25 is slidable at its body 30 along a cross-rod 31 and a cross-rack 32 upon retraction of a pawl 34, having a finger-piece 35, said pawl being normally spring-pressed to engage rack-teeth 33 for locating and holding said margin-gage at a selected letter-space station. The cross-rack 32 has side-arms 24 to rock, together with said margin-gage 25, about said cross-rod 31; said margin-gage 25 being splined to said cross-rack.

As the carriage 18, in its letter-feed advance, reaches a certain point, a cam-nose 37 will have coacted with a margin-gage cam 38 to rock said margin-gage and the cross-rack, and thereby, by means of a pendent arm 39, attached to said cross-rack, will, at said point, trip a bell-striker 41 to signal the approach of the line-end. As the carriage reaches the ordinary line-end position, the cam-nose 37, by means of another margin-gage cam 42, will further rock the margin-gage 25, cross-rack 32 and arm 39, and thereby move a locking bail 43 to lock the type-key-levers, represented at 44, Figure 1.

A button 45, Figure 1, is pressable, at will, to disengage the pendent arm 39 from the locking bail 43 which thereby becomes temporarily restored to permit carriage advance of a few spaces beyond its ordinary line-end position, the carriage, however, being finally arrested by means of the margin-stop lug 28, and the type-keys being finally locked by engagement of a secondary cam-nose 46 with the margin-gage cam 42. The dotted lines 47 on the work-sheet 21, Figure 1, illustrate the three carriage-positions at which the margin-gage 25 works to give the bell-signal, and to determine the first key-lock for the ordinary line-end, and the final line-end. A spring 48 restores the cross-rack 32 and margin-gage 25 to normal position, in which the cross-rack abuts a stop 49.

Return of the carriage 18 to line-starting or left work-sheet margin-determining position is gaged by interception of a counter-stop 51 on the carriage by a stop-lug 52 on a margin-gage 26.

For its lateral adjustment, said margin-gage 26 is slidable at its body 53, along the cross-rod 31 and a parallel rack-rod 54, upon retraction of a pawl 55, pivoted to said body and having a finger-piece 57 and being spring-pressed to normally engage rack-teeth 56 to locate and hold said margin-gage 26 at a selected letter-space station. The counter-stop 51, being part of a lever 59 which is pivoted to the carriage at 60 and has a key 61, may, by depressing said key, be raised to permit return of the carriage beyond the position determined by said margin-gage 26.

The novel mechanism for facilitating setting of the margin-gages 25, 26, relatively to selective line-length or work-sheet-width standards, will now be described.

Each of the margin-gages 25, 26 is provided with an arm 63 for margin-gage-setting contact with one or another of stops 64, 65, 66, mounted upon a cross-shaft 67. Said shaft, disposed below said margin-gages, may be journaled at its end-portions in the webs of the machine-frame standards 16, represented in sectional plan at Figure 3, and shaft-collars 68, abutting said standards, retain said shaft against endwise displacement.

For illustration, three pairs or six stops 64—66 are shown to provide for setting the margin-gages 25, 26, with reference to three standards of line-lengths, namely, short, long, and intermediate line-lengths, in order that the work-sheet 21 may have correspondingly, three standards of width of untyped right and left margins. Each of the stops 64—66 extends radially from a shaft-fitting hub or collar 69, having a set-screw 70, by which the collar and its stop are fastened to the shaft with the stop in proper position.

The three pairs of stops 64—66 are angularly spaced around the shaft, the stops of each pair being in line parallelly with the shaft 67, so that, upon rotating the latter to one or another of angularly spaced stations, one or another of the pairs of stops may be brought into line with the arms 63 of the margin-gages 25, 26.

The innermost pair of stops 64 is for the shortest-line length, and these stops are therefore set apart on the shaft, by means of their collars 69 and set-screws 70, to correspond with the adopted short-line standard. Similarly, the intermediate pair of stops 65 and the outermost pair of stops 66 are set apart on the shaft to correspond respectively with the adopted intermediate and long line standards.

Provision for determining rotation of the shaft 67 to the proper stations may be made as follows. Upon an extension 72 of the shaft, outside of one of the main-frame standards 16, a spring-detent arm 73, having a hub 74, is fastened by a set-screw 75, Figure 1.

Detent-stations 76, with one or another of which a suitable formation 77, at the end of said detent-arm 73, may coact, may be presented by a plate 78, secured, as by rivets 80, to an inner side-wall 81 of a hood 82. Said hood serves as a decorative mask over the detent-arm 73 and stations 76, and includes an outer wall 83, and top and front sides 84, which afford an opening 86 through which extends a shaft-arm or handle 87, which, as it registers with markings 88 on said top and front sides 84, indicates the line-length station at which the stop-shaft stands.

The hood 82, with its inner wall 81 against the main frame-standard 16, is fastened to the latter by a screw 90, Figures 2 and 3, said inner wall and also the outer hood-wall 83 being perforated to fit the shaft-extension 72, whereby the latter co-operates with said screw to maintain the hood in proper angular relation to the stops 64—66. The outer hood-wall 83 may have a perforation 91 for access to said hood-fastening screw 90. The shaft-extension 72 may project beyond the hood to carry a finger-wheel or knob 92.

The stop-engaging arms 63 of the margin-gages 25, 26 may have upper portions 93 bent horizontally for attachment to the tops of the margin-gage bodies 30, 53, by screws 94.

Figure 9 represents the stop-shaft 67 as being supported by an end-portion 95 of an arm 96, in lieu of journaling the shaft in the web of the main frame-standard 16, in case the latter has an opening 97 at the cross-shaft axis. Said arm 96 may extend from a suitable machine-framework member; Figure 10 showing said arm extending from a ribbon-spool bracket 98 of the Underwood machine and attached to the latter by screws 99, which also secure said bracket 98 to the machine-framework. By suitable formation, as indicated at 100, said arm 96 may present its shaft-supporting end-portion 95 in proximity to the web of the frame-standard 16, for attachment of the hood 82 to said end-portion 95 by the screw 90, a suitable spacer 101 being used to locate the hood against the outer side of the standard 16. In the Figure 10 arrangement, a shaft-collar 102 abutting the arm-end-portion 95 co-operates to retain the shaft against endwise displacement. It will be understood that there may be an arm similar to 96 at the other end of the stop-shaft.

Operation of the novel mechanism for resetting of the margin-stops 25, 26 may be summarized as follows:

Preparatory to typing on the work-sheet 21 in lines 103, say of shortest length, so as to leave the widest margins at the sides of the work-sheets, as diagrammatically represented at Figure 8, the stop-shaft 67 is rotated to the short-line station, which is indicated by the registry of the shaft-handle 87 with the (SL) marking 88, Figure 1, and by the accompanying self-engagement of the shaft-detent-arm-formation 77 with the shaft-detent station 76 corresponding to said short-line (SL) marking 88. It will be understood that said self-engagement of the shaft-detent-arm-formation 77 with the detent-station 76 is effected by reason of the lateral pressure of the resilient detent-arm 73 which causes said arm-formation 77 to settle into shaft-holding engagement with said station 76 when the stop-shaft 67 has been rotated thereto. The margin-gages 25, 26, assuming the same to have been previously set according to one of the longer-line standards, are now moved inwardly until their arms 63 abut their respective shaft-stops 64 which have been brought into alignment with said arms 63 by the preparatory rotation of the shaft 67 to the short-line station. The margin-gages 25, 26 thus reset by means of the short-line stops 64 will be held in short-line positions by reason of their respective spring-pressed pawls 34, 55, respectively, engaging the rack-teeth 33, 56.

If, following a period of typing in shortest lines, it is desired to change to typing on the work-sheet 21 in lines 104 of longest length so as to leave the narrowest margin at the sides of said work-sheet, as diagrammatically indicated in Figure 4, the shaft 67 may be rotated to the long-line station to bring the long-line stops 66 into line with the margin-gage arms 63, it being assumed for the present that said long-line stops 66 have the same spur-like form as is indicated for the short-line stops 64. When such long-line stops and the margin-gage-arms 63 are thus aligned, the margin-guides 25, 26 may be moved outwardly until their arms 63 abut such long-line stops, as is indicated in Figure 5. Said margin-guides 25, 26 will thus be reset to long-line positions in which they will be retained as long as desired by means of their respective pawls 34, 55.

Instead of making the long-line stops 66 of the above-mentioned spur-like form, said stops 66 may, as best seen in Figure 1, be in the form of flanges extending radially from their respective collars 69, so that they will be effective for setting the margin-gages thereto at any of the three line-length stations of the shaft 67. By such expedient, it is feasible to reset the margin-gages from short-line positions to longest-line positions, and vice versa, without rotating the shaft 67, since the latter, in such case, may be positioned at the shortest-line station, each margin-gage in such case being shiftable between the dotted and full line positions seen in Figure 9.

Typing upon the work-sheet 21 in lines of medium length is provided for by rotating the shaft 67 to medium-line-length station, such station being indicated by registry of the handle 87 with the medium-line (ML) marking 88 and by accompanying engagement of the spring-detent arm 73 with a corresponding detent-station 76. The margin-gages are then moved until their arms 63 abut the medium-line stops 65, as indicated in Figure 7, whereby said stops will be set for medium-length lines 105, to leave side-margins, on the work-sheet, of medium width, as represented in the diagram at Figure 6; it being understood that the margin-gages will be retained in the medium-line positions by means of their respective pawls 34, 55.

It may be noted that by reason of the flange-like form of the long-line stop 66, the shaft 67 may remain in the medium-line position, in case of a change from medium-line length to longest-line length or vice versa; the margin-gages 25, 26 in such case being shifted between the dotted and full line positions, indicated in Figure 7.

Provision is also made for an idle station of the shaft 67, in order that the margin-gages may be set, independently of the stops 64—66, within the machine's full range of margin-gage adjustment, it being understood that for such independent adjustment, the usual margin-gage-setting scale 106 and co-operating pointers 107, Figure 2, may be used. But the use of such scale and pointers is dispensed with for the three adopted standards of line-length determined by means of the shaft 67, thus conducing greatly to facilitating the resetting of the margin-gages for such line-length standards.

Rotation of the shaft 67 to its idle station, which will be indicated by registry of the handle 87 with the marking (I) 88 and by engagement of the detent-arm 73 with a corresponding detent-station 76, brings a notch 109 provided in the flange-forming edge of each long-line stop 66 into line with the margin-gage-arm 63, and also moves the short and medium line stops 64, 65 out of line with said margin-gage-arm 63, so that the margin-gages may be adjusted independently of said stops 64—66.

It may be noted that it would be feasible also to make the short-line stops 64 of flange-like form like the long-line stops 66, as is indicated at the Figure 3 diagram by the dotted outlines 110 representing such flanged short-line stops, which would also have notches 111 to align, at the idle shaft-station represented at Figure 3, with the arms 63 of the margin-gages 25, 26 for adjustment of the latter independently of the stops 64—66. In any case, the medium-line stops 65 would be of the indicated spur-like form or any other suitable form which would permit them to be passed by the margin-gage-arms 63 at the short-line, long-line and idle shaft stations.

It will be seen that the stops 64—66 are arranged relatively to the margin-gages 25, 26, so that the latter can perform their usual functions, such as the above-described line-end signaling and key-locking done by means of the margin-gage 25.

Variations may be resorted to within the scope of the invention, and portions of the improvements may be used without others.

Having thus described my invention, I claim:

1. In a typing machine, the combination with a letter-feeding carriage, and differentially settable margin-gages to limit the carriage-movement, of a plurality of margin-gage-setting stops, and means, operable at will, whereby said stops may be selectively interposed into line with companion features provided on the margin-gages, for gaging and thereby facilitating the setting of the margin-gages according to a plurality of certain line-length standards.

2. In a margin-gage mechanism for a letter-feeding typing-machine carriage, the combination with two differentially settable margin-gages for limiting the carriage-movements, of a shaft having a plurality of stops against which the margin-gages may be set, to thereby determine certain standards of line-lengths, said shaft being rotatable, at will, to selective stations, to bring into use selectively the stops corresponding to said line-length standards.

3. In a margin-gage mechanism for a letter-feeding typing-machine carriage, the combination with two differentially settable margin-gages for limiting the carriage-movements, of a shaft having a plurality of stops against which the margin-gages may be set, to thereby determine certain standards of line-lengths, said shaft being rotatable, at will, to selective stations, to bring into use selectively the stops corresponding to said line-length standards, and means for gaging the rotation of said shaft to said stations.

4. In a margin-gage mechanism for a letter-feeding typing-machine carriage, the combination with a differentially settable margin-gage operative to limit the carriage-movement, of a shaft having a plurality of stops spaced lengthwise and angularly thereof, said margin-gage being settable against and by means of said stops to certain different positions, said shaft being rotatable, at will, to selective stations corresponding to said margin-gage positions to bring into use the appropriate stops, said shaft being rotatable, at will, also to an idle station, at which all of said stops are ineffective, thereby enabling said margin-gage to be set independently of said stops.

5. The combination with a differentially settable margin-gage operative to limit the movement of a letter-feeding typing-machine carriage, of a shaft having three margin-gage-setting stops spaced lengthwise thereof, said shaft being rotatable, at will, to two stations, and the three stops being arranged so as to be usable selectively, by means of said two stations, for setting the margin-gage thereagainst, and thereby determining three positions of said margin-gage.

6. The combination with a differentially settable margin-gage operative to limit the movement of a letter-feeding typing-machine carriage, of a shaft having three margin-gage-setting stops spaced lengthwise thereof, said shaft being rotatable, at will, to two stations, and the three stops being arranged so as to be usable selectively, by means of said two stations, for setting the margin-gage thereagainst, and thereby determining three positions of said margin-gage, said shaft being rotatable also to a third station, and said stops being arranged to clear said margin-gage at said third station, for setting said margin-gage independently of said stops.

7. In a typing machine having a letter-feeding carriage, the combination with a carriage-movement-limiting margin-gage, and a rack for locating the margin-gage at different stations, of a shaft, and a stop settable along said shaft for setting the margin-gage thereto to locate the margin-gage at a certain one of said stations, said shaft being rotatable to different positions, at will, to present said stop for margin-gage-setting or to withdraw said stop for setting the margin-gage independently thereof.

8. In a typing machine having a letter-feeding carriage, the combination with a carriage-movement-limiting margin-gage, and a rack for locating the margin-gage at different stations, of a shaft, and a plurality of stops differentially locatable on said shaft and operative for setting the margin-gage thereto and thereby at certain ones of said rack-stations, said shaft being rotatable to different positions, to selectively present said stops for margin-gage-setting or to withdraw all of said stops for setting the margin-gage independently thereof.

9. The combination with typing keys, a letter-feeding carriage, a differentially settable margin-gage therefor, and means whereby said margin-gage functions to lock said keys to limit the carriage-travel at the end of a typed line, of a plurality of margin-gage-setting stops, and means operable, at will, preparatory to the setting of said margin-gage, to position and thereby selectively bring said stops into use for setting the margin-gage thereto according to selected line-end positions of the carriage, said stops and margin-gage being relatively arranged so that the margin-gage, after being set to the selected one of said stops, may function for locking said keys at the line-end without withdrawing the selected stop.

10. In a typing machine having typing keys and a letter-feeding carriage, the combination with a differentially settable margin-gage for the carriage, and means whereby said margin-gage functions to signal carriage approach to a line-end, of a plurality of margin-gage-setting stops, and means operable, at will, preparatory to the setting of said margin-gage, to position and thereby selectively bring said stops into use for setting the margin-gage thereto, according to predetermined line-end positions of the carriage, said stops and margin-gage being relatively arranged so that the margin-gage, after being set to the selected one of said stops, may function for signaling the line-end approach without withdrawing the selected stop.

11. In a typing machine having a main frame and a letter-feeding carriage supported for travel relatively to said frame, the combination with carriage-movement-limiting margin-gages supported for adjustable locations relatively to said frame, of a cross-shaft rotatably supported on said main frame, stops on said shaft for adjusting the margin-gages thereto and thereby adjusting said margin-gages according to certain line-length standards, said shaft being rotatable to different stations for selective use of said stops, and means on said shaft and frame for indicating the shaft-stations and corresponding line-lengths.

12. In a typing machine having a main frame and a letter-feeding carriage supported for travel relatively to said frame, the combination with carriage-movement-limiting margin-gages supported for adjustable locations relatively to said frame, of a cross-shaft rotatably supported on said main frame, stops on said shaft for adjusting the margin-gages thereto and thereby adjusting said margin-gages according to certain line-length standards, said shaft being rotatable to different stations for selective use of said stops, and means on said shaft and frame for detenting the shaft at said stations and indicating the corresponding line-lengths.

13. In a typing machine having a letter-feeding carriage, the combination with two differentially settable carriage-movement-limiting margin-gages, of a shaft provided with a plurality of stops, said shaft being supported for rotation to different stations to selectively present said stops for adjustment of the margin-gages thereto in accordance with a plurality of line-lengths including a short line, a long line and a medium length line.

14. In a typing machine having a letter-feeding carriage, the combination with two differentially settable carriage-movement-limiting margin-gages, of a shaft provided with a plurality of stops, said shaft being supported for rotation to different stations to selectively present said stops for adjustment of the margin-gages thereto in accordance with a plurality of line-lengths including a short line, a long line and a medium length line, said stops being arranged in pairs, in accordance with the provision of said two margin-gages, one pair of stops for each line-length.

15. In a typing machine having a letter-feeding carriage, the combination with two differentially settable carriage-movement-limiting margin-gages, of a shaft provided with a plurality of stops, said shaft being supported for rotation to different stations to selectively present said stops for adjustment of the margin-gages thereto in accordance with a plurality of line-lengths including a short line, a long line and a medium length line, said stops being arranged in pairs, in accordance with the provision of said two margin-gages, one pair of stops for each line-length, two of said pairs of stops being operative, at one of said shaft-stations, for selectively setting the margin-gages thereto for two of said line-lengths.

16. In a typing machine having a letter-feeding carriage, the combination with two differentially settable carriage-movement-limiting margin-gages, of a shaft provided with a plurality of stops, said shaft being supported for rotation to different stations to selectively present said stops for adjustment of the margin-gages thereto in accordance with a plurality of line-lengths including a short line, a long line and a medium length line, said stops being arranged in pairs, in accordance with the provision of said two margin-gages, one pair of stops for each line-length, a different two of said pairs of stops being operative, at each of two of said shaft-stations, for selectively setting the margin-gages thereto for two of said line-lengths.

JESSE A. B. SMITH.